(12) United States Patent
Schwindt et al.

(10) Patent No.: US 9,428,188 B2
(45) Date of Patent: Aug. 30, 2016

(54) LANE ASSIST FUNCTIONS FOR VEHICLES WITH A TRAILER

(71) Applicant: Robert Bosch GmbH, Stuttgart (DE)

(72) Inventors: Oliver Schwindt, Palo Alto, CA (US); Xavier Zhu, Northville, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/567,419

(22) Filed: Dec. 11, 2014

(65) Prior Publication Data

US 2016/0167651 A1    Jun. 16, 2016

(51) Int. Cl.
| | |
|---|---|
| *B60W 30/12* | (2006.01) |
| *B60W 10/20* | (2006.01) |
| *B60W 50/14* | (2012.01) |
| *G06K 9/00* | (2006.01) |
| *B60W 50/16* | (2012.01) |

(52) U.S. Cl.
CPC .............. *B60W 30/12* (2013.01); *B60W 10/20* (2013.01); *B60W 50/14* (2013.01); *G06K 9/00798* (2013.01); *B60W 50/16* (2013.01); *B60W 2050/143* (2013.01); *B60W 2050/146* (2013.01); *B60W 2510/20* (2013.01); *B60W 2550/20* (2013.01); *B60W 2710/20* (2013.01)

(58) Field of Classification Search
CPC ....... B60Q 1/00; B62D 6/00; G06K 9/00798
USPC ...................... 701/41, 70; 340/431, 901, 937
See application file for complete search history.

(56) References Cited

U.S. PATENT DOCUMENTS

| | | | |
|---|---|---|---|
| 8,350,684 B2 * | 1/2013 | McClure ................ | B60Q 9/008 340/431 |
| 8,428,821 B2 | 4/2013 | Nilsson | |
| 8,451,107 B2 | 5/2013 | Lu et al. | |
| 8,538,674 B2 | 9/2013 | Breuer et al. | |
| 8,665,078 B2 * | 3/2014 | Van Wiemeersch .. | B60W 30/12 340/425.5 |
| 9,238,483 B2 * | 1/2016 | Hafner ................... | B62D 13/06 |
| 2006/0261936 A1 | 11/2006 | Widmann et al. | |
| 2011/0140872 A1 | 6/2011 | McClure | |
| 2013/0027195 A1 | 1/2013 | Van Wiemeersch et al. | |
| 2013/0345900 A1 | 12/2013 | Usui | |
| 2014/0085472 A1 | 3/2014 | Lu et al. | |
| 2014/0160276 A1 | 6/2014 | Pliefke et al. | |
| 2014/0176716 A1 | 6/2014 | Wallat et al. | |

FOREIGN PATENT DOCUMENTS

WO    2012103193    8/2012

OTHER PUBLICATIONS

European Patent Office Action for Application No. 15192109.5 dated Apr. 19, 2016 (7 pages).

* cited by examiner

*Primary Examiner* — Thomas G Black
*Assistant Examiner* — Luke Huynh
(74) *Attorney, Agent, or Firm* — Michael Best & Friedrich LLP

(57) ABSTRACT

A system is provided for supporting lane assist functions for a vehicle towing a trailer. The system includes performing lane departure warning and lane centering assist functions that operate differently when the presence of a trailer is detected. The system warns the driver if either the vehicle or trailer will depart the lane, using different warnings for the vehicle and trailer. The system further provides lane centering assist functions that operate to center the vehicle and trailer together. Corresponding methods are also provided.

8 Claims, 5 Drawing Sheets

LANE ASSIST FUNCTIONS FOR VEHICLES WITH A TRAILER

BACKGROUND

Embodiments of the invention relate to lane assist systems for use with a vehicle towing a trailer.

SUMMARY

In one exemplary embodiment, the invention provides a lane departure warning system for a vehicle towing a trailer. The system includes a camera configured to be positioned on the vehicle for capturing images of the road, and a controller. The controller receives a trailer-presence signal indicating whether a trailer is attached to the vehicle, processes the images of the road to detect the lane the vehicle is travelling in, and detects the boundaries of the lane.

The controller then determines a value, representing the distance from the vehicle to the boundary of the lane, determines a threshold for that value, subtracts the threshold from the value, and generates a command to activate a vehicle-lane-departure warning mechanism if the result of the subtraction is negative.

The controller then determines a value, representing the time it will take the vehicle to cross the boundary of the lane, determines a threshold for that value, subtracts the threshold from the value, and generates a command to activate a vehicle-lane-departure warning mechanism if the result is negative.

If the trailer-presence signal indicates that a trailer is attached to the vehicle, the processor receives trailer-vehicle dimensions, and determines a value, representing the distance from the trailer to the boundary of the lane, determines a threshold for that value, subtracts the threshold from the value, and generates a command to activate a trailer-lane-departure warning mechanism if the result is negative.

If the trailer-presence signal indicates that a trailer is attached to the vehicle, the processor receives trailer-vehicle dimensions, and determines a value, representing the time it will take the trailer to cross the boundary of the lane, determines a threshold for that value, subtracts the threshold from the value, and generates a command to activate a trailer-lane-departure warning mechanism if the result is negative.

In another exemplary embodiment, the invention provides a lane departure warning system where the vehicle-lane-departure warning mechanism is an audio warning, a visual warning, a visual warning on an instrument cluster, a haptic warning delivered through a steering wheel, a haptic warning delivered through a driver's seat, or some combination of the foregoing, and the trailer-lane-departure-warning mechanism includes at least one of an audio warning, a visual warning, a visual warning on an instrument cluster, a haptic warning delivered through a steering wheel, and a haptic warning delivered through a driver's seat, or some combination of the preceding.

In another exemplary embodiment of the lane departure warning system, the trailer-presence signal is generated by a sensor.

In another exemplary embodiment of the lane departure warning system, the trailer-presence signal is generated by a vehicle user making a selection on a human machine interface.

In another exemplary embodiment, the invention provides a lane centering assist system for a vehicle. The system includes a camera configured to be positioned on the vehicle for capturing one or more images of the road, and a controller. The controller receives a trailer-presence signal indicating whether a trailer is attached to the vehicle, processes the images, detects a lane based on the images, detects an outer boundary of the lane, and detects an inner boundary of the lane.

If the trailer-presence signal indicates that a trailer is attached to the vehicle, the controller determines an outer point, which is located at the front of the vehicle, adjacent to the side of the vehicle closest to the outer boundary of the lane, and an inner point, which is located between the trailer's wheels, and controls the vehicle steering system to steer the vehicle to keep the vehicle and the trailer centered in the lane.

In another embodiment, the controller controls the vehicle steering system to steer the vehicle to keep the vehicle and the trailer centered in the lane by regulating to a desired relation between the outer point and the inner point equidistant to the outer boundary and the inner boundary of the lane.

In another exemplary embodiment of the lane centering assist system, the trailer-presence signal is generated by a sensor.

In another exemplary embodiment of the lane centering assist system, the trailer-presence signal is generated by a vehicle user making a selection on a human machine interface.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Lane assist systems can perform lane departure warning (LDW) functions, lane keeping support (LKS) functions, and/or lane centering assist (LCA) functions. LDW functions monitor a vehicle as it drives in a lane, and issue a warning to the driver when the vehicle is about to depart the lane. LKS functions monitor a vehicle as it drives in a lane, and provide a torque input when the vehicle is in danger of leaving the lane. LCA functions provide constant steering of the vehicle to keep the vehicle centered in the lane. Embodiments of the invention relate to lane assist systems that provide LDW and LCA functions that operate differently when the vehicle is towing a trailer. Although certain embodiments and aspects the description that follow will refer specifically to LDW and LCA functions, the concepts and strategies described here are applicable to LKS, other lane assist functions, and combinations of lane assist functions.

Figure 1:
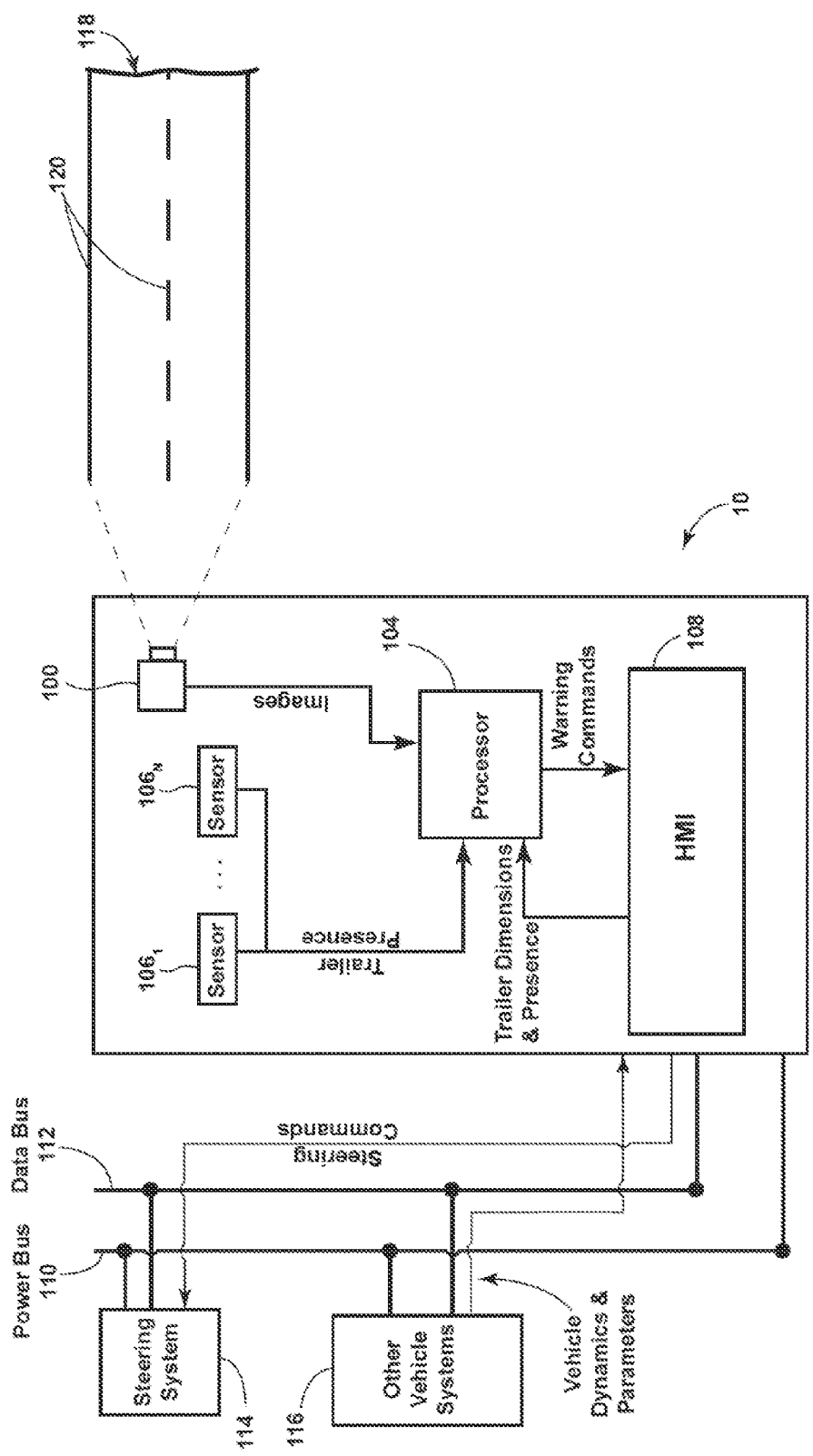
FIG. 1 is illustrates a lane assist system for use with a vehicle towing a trailer.

FIG. 1 illustrates a lane assist system 10 for use with a vehicle towing a trailer. The system includes a camera 100, a processor 104, sensors 106, and a human machine interface (HMI) 108. The system 10 is connected to a vehicle using a power bus 110 and a data bus 112. The data bus uses the controller area network (CAN) protocol or another communications protocol to provide communication between system 10, vehicle steering system 114, and other vehicle systems 116. While a data bus is used in some embodiments, other connections between the processor, sensors, and other components may be used.

The camera 100 is positioned on the vehicle so that it can capture images of the road. In some embodiments, the camera 100 is positioned inside the vehicle behind the windscreen. In other embodiments, the camera is positioned elsewhere on the vehicle. The camera 100 communicates the images to the processor 104. The processor 104 processes the images to detect a lane 118 and one or more boundaries 120 for the lane 118.

The processor 104 is connected to the data bus 112, and is capable of receiving data from other vehicle systems 116 relating to velocity, yaw rate, steering angle, and other variables useful in carrying out lane assist functions. The processor 104 is configured to determine the positions of the vehicle and trailer in the lane 118 with respect to the boundaries 120, and use the data from other vehicle systems 116 to determine if and when the positions of either the vehicle or the trailer will vary from the desired positions of both within the lane. If processor 104 determines that the vehicle or trailer will vary from the desired position, it is configured to issue warnings to the driver via HMI 108, issue commands to other vehicle systems 116 to prevent or correct the variance, or both. If the vehicle is not towing a trailer, processor 104 is configured to perform the above functions with respect to the vehicle only.

The sensors 106 are configured to detect the presence of a trailer attached to the vehicle, and communicate information regarding the detection to the processor. A number of different types of sensors are useful in embodiments of the invention including radar, sonar, and other sensor capable of detecting the trailer. Instead of or in addition to detecting the presence of the trailer using sensors 106, a driver may make a manual selection using HMI 108 to communicate the presence of a trailer to the processor 104.

The HMI 108 provides an interface between the system and the driver. The HMI 108 is coupled to the controller and is configured to receive input from the driver, receive indications of problems from the controller, and provide warnings to the driver based on the received indications. The HMI 108 provides a suitable input method such as a button, a touch-screen display having menu options, voice recognition, etc. for manually selecting the presence of a trailer and providing dimensions and other characteristics of the trailer that are useful in carrying out lane assist functions to the processor.

The HMI 108 is configured to provide warnings to the driver. In some embodiments of the invention, HMI 108 provides an audio warning to the driver such as a chime, buzzer, or other suitable sound. In other embodiments, HMI 108 is configured to provide a visual warning to the driver using a suitable indicator such as a tell-tale light on an instrument cluster, a mirror, a heads-up display, or touch-screen display. In other embodiments, HMI 108 is configured to provide a haptic feedback warning to the driver by vibrating the vehicle's steering wheel, the driver's seat, or both. In some embodiments, HMI 108 is configured to provide a combination of audio, visual and haptic feedback warnings.

Figure 2:
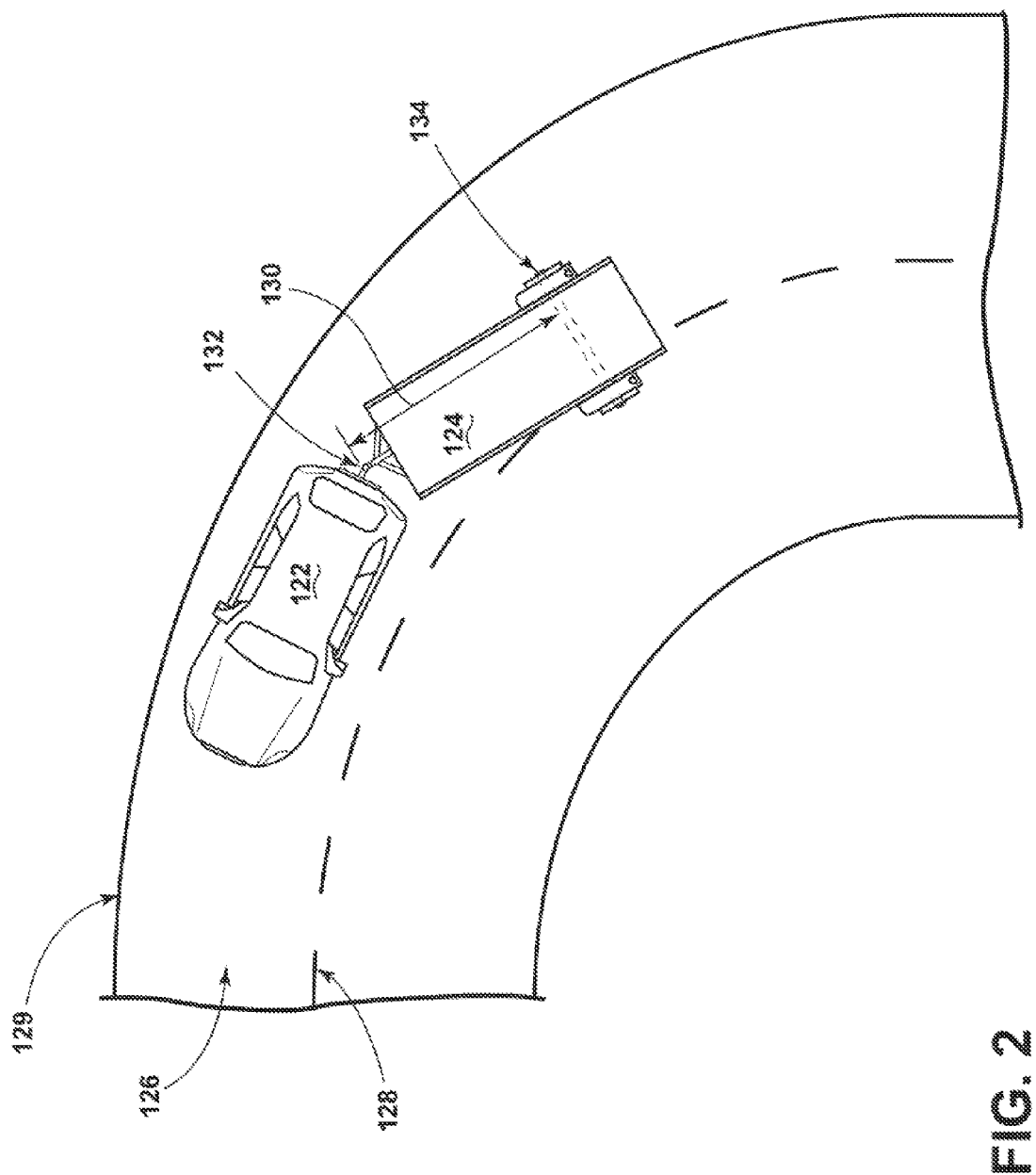
FIG. 2 illustrates a vehicle towing a trailer within a curved lane, with vehicle being steered such that the trailer is cutting the corner.

FIG. 2 illustrates a vehicle 122 towing a trailer 124 through a curved lane 126. The lane assist functions takes into account that when vehicle 122 tows trailer 124 through lane 126, the trailer 124 will be closer to the inner boundary 128 of the lane 126 than the vehicle 122. The paths of the trailer's edge with respect to the boundary 128 will depend mainly on a distance 130 from the pivot point 132 to the trailer's wheels 134. Because the trailer 124 gets closer to the boundary 128 than the vehicle 122, inexperienced drivers often steer the vehicle in a manner that causes the trailer 124 to cut the corner, as illustrated in FIG. 2. This happens because the drivers do not know to steer widely to prevent this. The drivers can successfully keep their vehicles in the lane 126, while allowing their trailers to depart the lane 126. In the prior art, a LDW system only warns the driver when the vehicle is departing the lane 126. For this reason, a warning that the trailer 124 is departing the lane 126 is helpful.

Many LDW systems determine a distance to lane (DLC) or time to lane crossing (TLC). DLC represents the distance between the vehicle 122 and one of the boundaries 128 and 129 of the lane 126. TLC represents the time it will take the vehicle 122 to cross a lane boundary if it continues on its present trajectory. The LDW system gives the driver a warning when one or both of these parameters are below a certain minimum threshold. Some embodiments of the invention calculate these parameters for both the vehicle 122 and the trailer 124 it is towing, if present. Distinct warnings are issued depending on whether the vehicle 122 or trailer 124 is in danger of departing the lane 126. The exact strategy is adaptable to the specific needs of the vehicle 122 and trailer 124 combination. For example, the same DLC and TLC thresholds might be used for the trailer 122 and vehicle 124 to deliver a consistent experience, or the thresholds for the trailer 124 may be adjusted based on the curvature of the lane 126 or the length of the trailer 124, to minimize driver annoyance.

Figure 3:
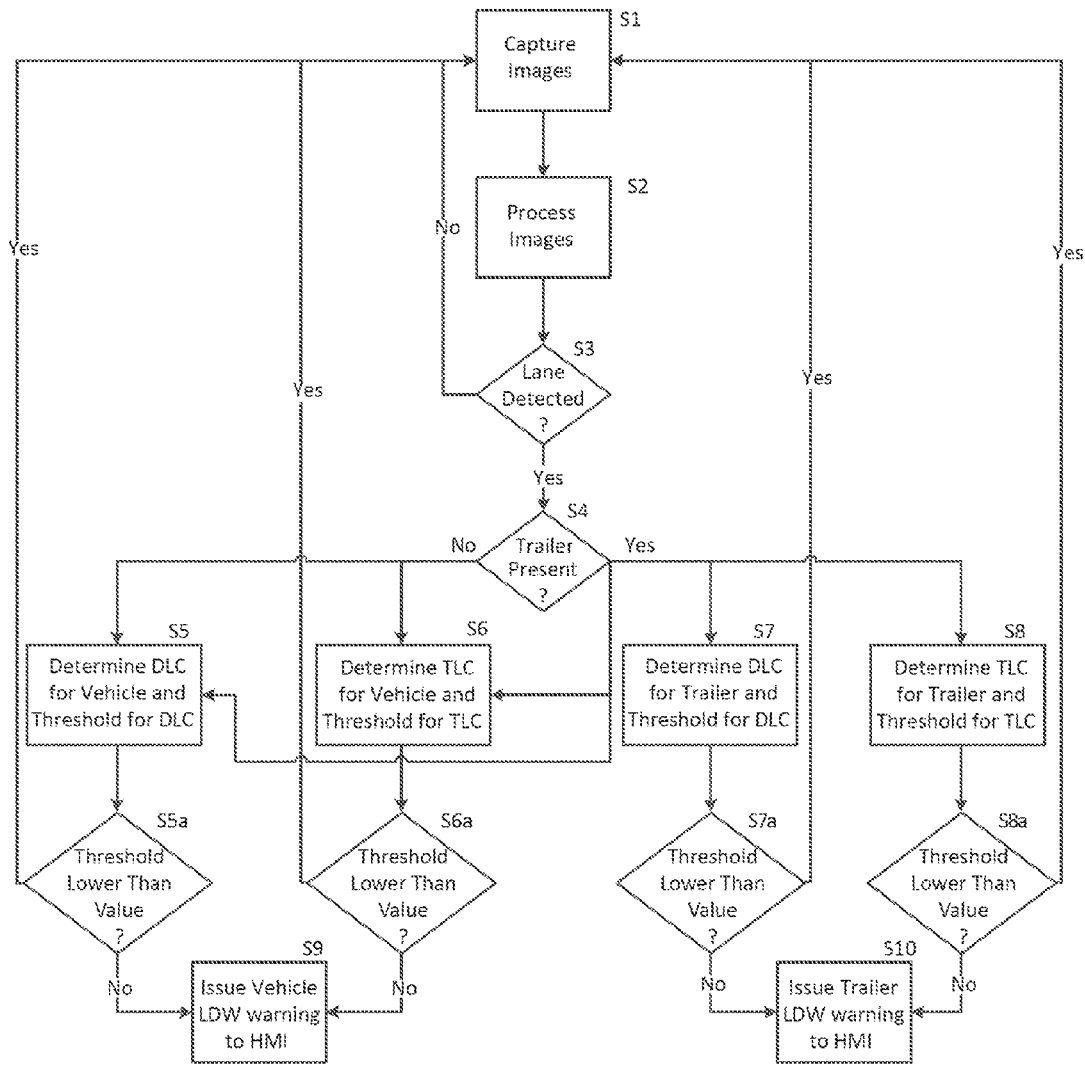
FIG. 3 is a flow chart of an exemplary method of using the lane assist system of FIG. 1 with the vehicle and trailer in FIG. 2 to provide lane departure warnings for a vehicle towing a trailer.

FIG. 3 is a flow chart of an exemplary method of using the lane assist system of FIG. 1 to provide LDW functions for a vehicle towing a trailer, as illustrated in FIG. 2.

In step S1, the camera 100 captures images of a road. In step S2, the processor 104 processes the images. In step S3, the processor 104 detects the lane 126 and the boundaries 128 and 129. If no lane is detected in this step, the method starts again at step S1. If a lane is detected, then, in step S4, the presence or absence of a trailer 124 is determined. If a trailer is present, the processor continues with steps S5, S6, S7, and S8. If a trailer is absent, the processor continues only with steps S5, and S6.

In step S5, the processor determines DLC values for the vehicle 122, each representing the distances from the vehicle 122 to one of the boundaries 128 and 129 of the lane 126, and a threshold for each value. The thresholds represent a minimum allowable distance between the vehicle 122 and the boundaries 128 and 129. In step S5a, the processor 104 compares the thresholds to the DLC values. If a DLC value is higher than its threshold, the processor 104 starts over with the next image at step S1. If a DLC value is lower than its threshold, then the processor 104 generates a command to the HMI 108 to activate a vehicle-lane-departure warning mechanism in step S9.

In step S6, the processor 104 determines TLC values for the vehicle 122, each representing the time it will take the vehicle 122 to cross one of the boundaries 128 and 129 of the lane, and a threshold for each value. The thresholds represent a minimum allowable time. In step S6a, the processor 104 compares the thresholds to the values. If a TLC value is higher than its threshold, the processor 104 starts over with the next image at step S1. If a TLC value is lower than its threshold, then the processor 104 generates a command to the HMI 108 to activate a vehicle-lane-departure warning mechanism in step S9.

In step S7, the processor 104 determines DLC values for the trailer, each representing the distances from the trailer 124 to one of the boundaries 128 and 129 of the lane, and a threshold for each value. The thresholds represent a minimum allowable distance between the trailer 124 and the lane boundaries 128 and 129. In step S7a, the processor 104 compares the thresholds to the values. If a value is higher than its threshold, the processor 104 starts over with the next image at step S1. If a value is lower than its threshold, then the processor 104 generates a command to the HMI 108 to activate a trailer-lane-departure warning mechanism in step S10.

In step S8, the processor 104 determines TLC values for the trailer 124, each representing the time it will take the trailer 124 to cross one of the boundaries 128,129 of the lane, and a threshold for each value. The threshold represents a minimum allowable time. In step S8a, the processor 104 compares the thresholds to the values. If a value is higher than its threshold, the processor 104 starts over with the next image at step S1. If a value is lower than its threshold, then the processor 104 generates a command to the HMI 108 to activate a trailer-lane-departure warning mechanism in step S10.

Figure 4:
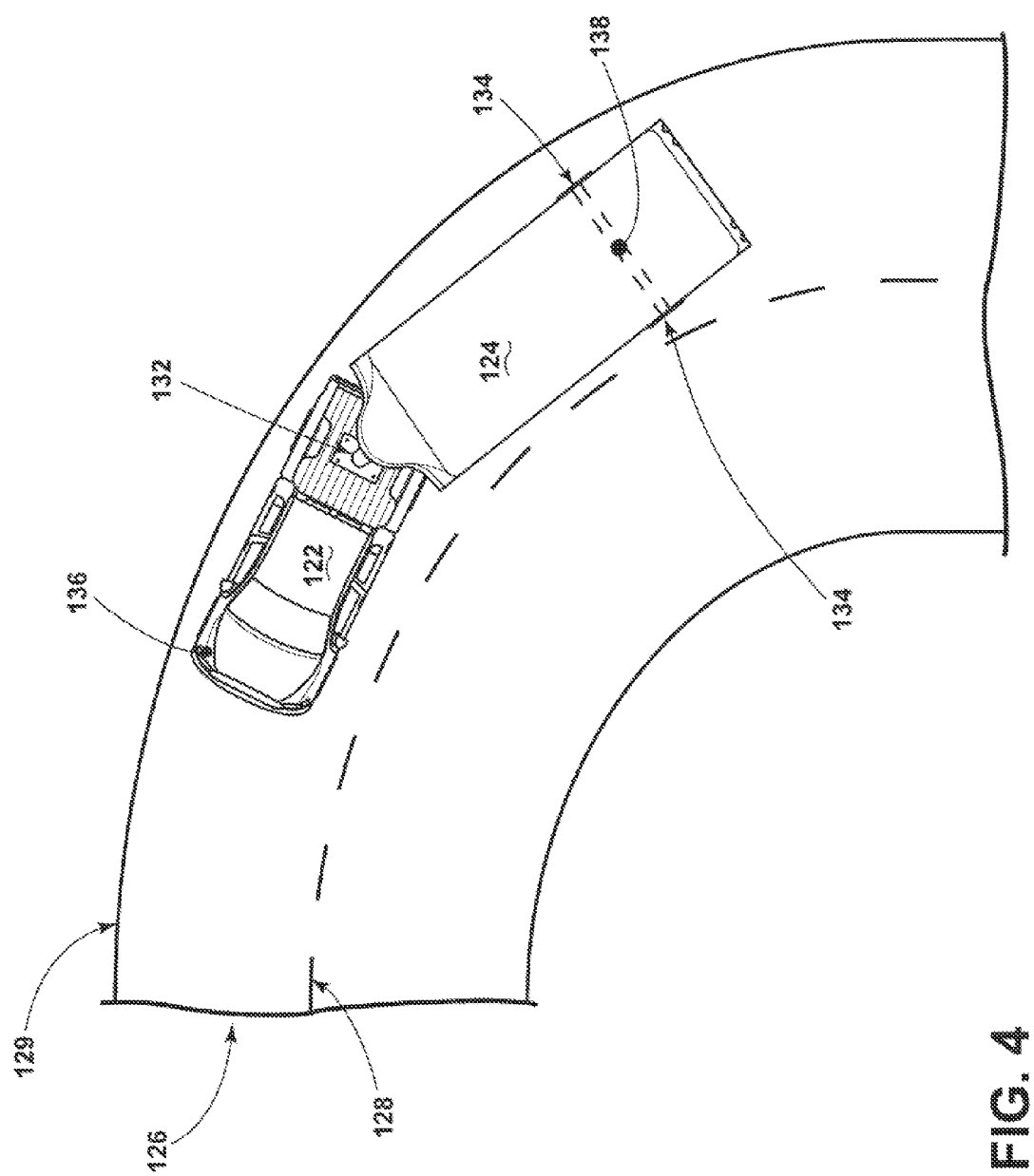
FIG. 4 illustrates a towing vehicle and a trailer within a lane.

FIG. 4 illustrates a vehicle 122 towing a trailer 124 through a curved lane. A lane centering assist (LCA) function prevents a trailer 124 being towed by a vehicle 122 from departing the lane 126 and crossing one of the boundaries 128 and 129. An LCA function helps to keep drivers from forgetting that they are towing a trailer 124, and also reduces the burden of drivers having to imagine how their trailer will pass through lane 126.

The trailer's position in the lane can be calculated using the vehicle's position in the lane and certain dimensions:

$$X = R - \sqrt{R^2 - L^2}$$

where

R=SteeringWheelAngle/SteeringRatio/WheelBase
L is the length of the trailer measured from the pivot point 132, and X is how much the trailer is diverging from the center of the vehicle's trajectory at its rear axle. By adding X to the vehicle's position in the lane, a separate value for the trailer can be determined.

As shown in FIG. 4, the model described above assumes that the pivot point 132 of the trailer 124 is above the rear axle of the vehicle, as in a fifth wheel trailer mount. The model differs when the pivot point is a trailer hitch, but it can be determined by one skilled in the art using geometry.

Figure 5:
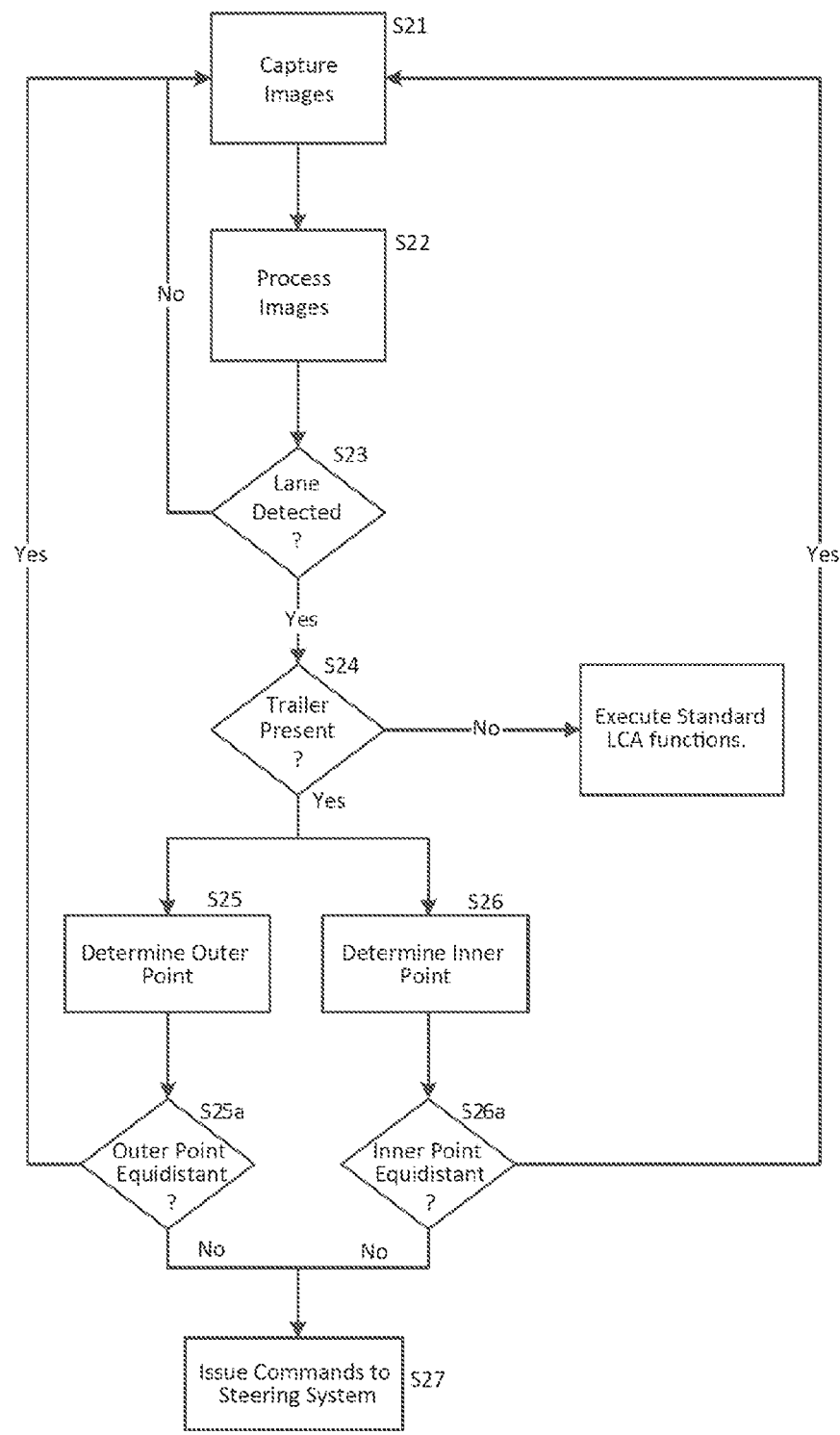
FIG. 5 is a flow chart of an exemplary method of using the lane assist system of FIG. 1 with the vehicle and trailer in FIG. 4 to provide lane centering assist functions for a vehicle towing a trailer.

FIG. 5 is a flow chart of a method of using the lane assist system of FIG. 1 to provide LCA functions for a vehicle towing a trailer through a curve, as illustrated in FIG. 4.

In step S21, the camera 100 captures images of a road. In step S22, the processor 104 processes the images. In step S23, the processor detects the lane 126, an inner boundary 128, and an outer boundary 129. If no lane is detected in this step, the method starts again at step S21. If a lane is detected, then, in step S24, the presence or absence of a trailer 124 is determined. If a trailer is present, the processor 104 continues with steps S25 and S26. If a trailer is absent, the processor 104 executes the standard LCA functions in step S27, which do not take into account a trailer.

In step S25, the processor 104 determines an outer point 136. The outer point 136 is normally located at the front of the vehicle 122, adjacent to the side of the vehicle closest to the outer boundary 129. In step S25a, the processor 104 determines whether the outer point 136 is equidistant to the inner boundary 128 and the outer boundary 129. If it is, the processor 104 starts over with the next image at step S21. If not, in step S27, the processor 104 issues a command to the steering system 114 to steer the vehicle 122 to keep the vehicle 122 and the trailer 124 centered in the lane 126.

In step S26, the processor 104 determines an inner point 138. The inner point is normally located between the trailer's wheels 134. In step S26a, the processor whether the inner point 138 is equidistant to the inner boundary 128 and the outer boundary 129. If it is, the processor 104 starts over with the next image at step S21. If not, in step S27, the processor 104 issues a command to the steering system 114 to steer the vehicle 122 to keep the vehicle 122 and the trailer 124 centered in the lane 126.

Thus, the invention provides, among other things, a system and method for providing lane keeping assistance to the driver of a towing vehicle towing a trailer. Various features and advantages of the invention are set forth in the following claims.

What is claimed is:

1. A lane departure warning system for a vehicle, the system comprising:
   a camera configured to be positioned on the vehicle for capturing one or more images of a road;
   a controller configured to
      receive a trailer-presence signal indicating whether a trailer is attached to the vehicle,
      process the one or more images,
      detect a lane based on the one or more images,
      detect a boundary of the lane based on the one or more images,
      determine a first value, representing a distance from the vehicle to the boundary of the lane, determine a first threshold for the first value, subtract the first threshold from the first value, and generate a command to activate a vehicle-lane-departure warning mechanism if the result of the subtraction is negative;
      determine a second value, representing the time it will take the vehicle to cross the boundary of the lane, determine a second threshold for the second value, subtract the second threshold from the second value, and generate a command to activate a vehicle-lane-departure warning mechanism if the result is negative;
      and, if the trailer-presence signal indicates that a trailer is attached to the vehicle, receive a plurality of trailer-vehicle dimensions,
      determine a third value, representing a distance from the trailer to the boundary of the lane, determine a third threshold for the third value; subtract the third threshold from the third value, and generate a command to activate a trailer-lane-departure warning mechanism if the result is negative;
      determine a fourth value, representing the time it will take the trailer to cross the boundary of the lane, determine a fourth threshold for the fourth value, subtract the fourth threshold from the fourth value, and generate a command to activate a trailer-lane-departure warning mechanism if the result is negative.

2. The system of claim 1, wherein the vehicle-lane-departure warning mechanism includes at least one of an audio warning, a visual warning, a visual warning on an instrument cluster, a haptic warning delivered through a steering wheel, and a haptic warning delivered through a driver's seat;

and wherein the trailer-lane-departure-warning mechanism includes at least one of an audio warning, a visual warning, a visual warning on an instrument cluster, a haptic warning delivered through a steering wheel, and a haptic warning delivered through a driver's seat.

3. The system of claim 1, wherein the trailer-presence signal is generated by a sensor.

4. The system of claim 1, wherein the trailer-presence signal is generated by a vehicle user making a selection on a human machine interface.

5. A lane centering assist system for a vehicle, the system comprising:
 a camera configured to be positioned on the vehicle for capturing one or more images of a road; and
 a controller configured to
  receive a trailer-presence signal indicating whether a trailer is attached to the vehicle,
  process the one or more images,
  detect a lane based on the one or more images,
  detect an outer boundary of the lane based on the one or more images,
  detect an inner boundary of the lane based on the one or more images, and, if the trailer-presence signal indicates that a trailer is attached to the vehicle,
  determine an outer point, the outer point being located at the front of the vehicle,
  adjacent to the side of the vehicle closest to the outer boundary of the lane;
  determine an inner point, the inner point being located between the trailer's wheels; and
  control a steering system to steer the vehicle to keep the vehicle and the trailer centered in the lane.

6. The system of claim 5, wherein the controller is further configured to control a steering system to steer the vehicle to keep the vehicle and the trailer centered in the lane by regulating to a desired relation between the outer point and the inner point equidistant to the outer boundary and the inner boundary.

7. The system of claim 5, wherein the trailer-presence signal is generated by a sensor.

8. The system of claim 5, wherein the trailer-presence signal is generated by a vehicle user making a selection on a human machine interface.

\* \* \* \* \*